United States Patent
Stewart

(10) Patent No.: US 10,230,319 B2
(45) Date of Patent: Mar. 12, 2019

(54) HIGHER-ELECTRO-INFUSION SYSTEMS FOR ELECTRICAL POWER

(71) Applicant: Charles Frederick Stewart, Fountain Valley, CA (US)

(72) Inventor: Charles Frederick Stewart, Fountain Valley, CA (US)

(73) Assignee: Charles Frederick Stewart, Fountain Valley, CA (US)

( * ) Notice: Subject to any disclaimer, the term of this patent is extended or adjusted under 35 U.S.C. 154(b) by 94 days.

(21) Appl. No.: 15/731,365

(22) Filed: Jun. 1, 2017

(65) Prior Publication Data

US 2018/0026566 A1 Jan. 25, 2018

Related U.S. Application Data

(63) Continuation-in-part of application No. 13/998,996, filed on Dec. 31, 2013.

(51) Int. Cl.
| | |
|---|---|
| *H02P 27/06* | (2006.01) |
| *H02P 25/02* | (2016.01) |
| *F02B 63/04* | (2006.01) |
| *F02D 37/02* | (2006.01) |
| *H02J 1/00* | (2006.01) |

(52) U.S. Cl.
CPC ............. *H02P 27/06* (2013.01); *F02B 63/04* (2013.01); *F02D 37/02* (2013.01); *H02J 1/00* (2013.01); *H02P 25/02* (2013.01)

(58) Field of Classification Search
CPC .. H02P 27/06; H02P 25/02; H02J 1/00; F02B 63/04; F02D 37/02
See application file for complete search history.

(56) References Cited

U.S. PATENT DOCUMENTS

| | | | | | |
|---|---|---|---|---|---|
| 3,600,655 | A | * | 8/1971 | Karlin | ........................ H02P 5/74 318/257 |
| 3,971,972 | A | * | 7/1976 | Stich | ........................ H02P 27/08 318/811 |
| 4,284,943 | A | * | 8/1981 | Rowe | ..................... E21B 43/128 137/487.5 |
| 4,292,577 | A | * | 9/1981 | Cesarz | ................... H02P 27/045 318/723 |
| 6,121,749 | A | * | 9/2000 | Wills | ........................ H02P 1/44 318/751 |

* cited by examiner

*Primary Examiner* — Michael C Zarroli

(57) ABSTRACT

This system changes the way internal Gasoline, Diesel, Turbine, and Combustion Engines (10) operating portable Alternators/Generators (30), or Stationary Power Stations (40) produce AC/DC, at any Hertz electrical input power to any Hertz Energy Conversion Unit/Variable Frequency Drive ECU/VFD (50). Where the output from the ECU/VFD to the Electric motor (80), using all the controlling systems, so the momentary power loss systems can go up to 100%, which is higher than normally used. From the ECU/VFD oversize capacitors (60) can go to 100% when used internally/externally or both. Starting at any Hertz, the voltage is decreased exactly 10.4165% less Hertz from the ECU/VFD, into the Motor (80), where it is then reduced 37.5%. The first reduction in any cycles is less allowing smaller internal combustion engines Alternators/Generators operating larger electric motors.

1 Claim, 3 Drawing Sheets

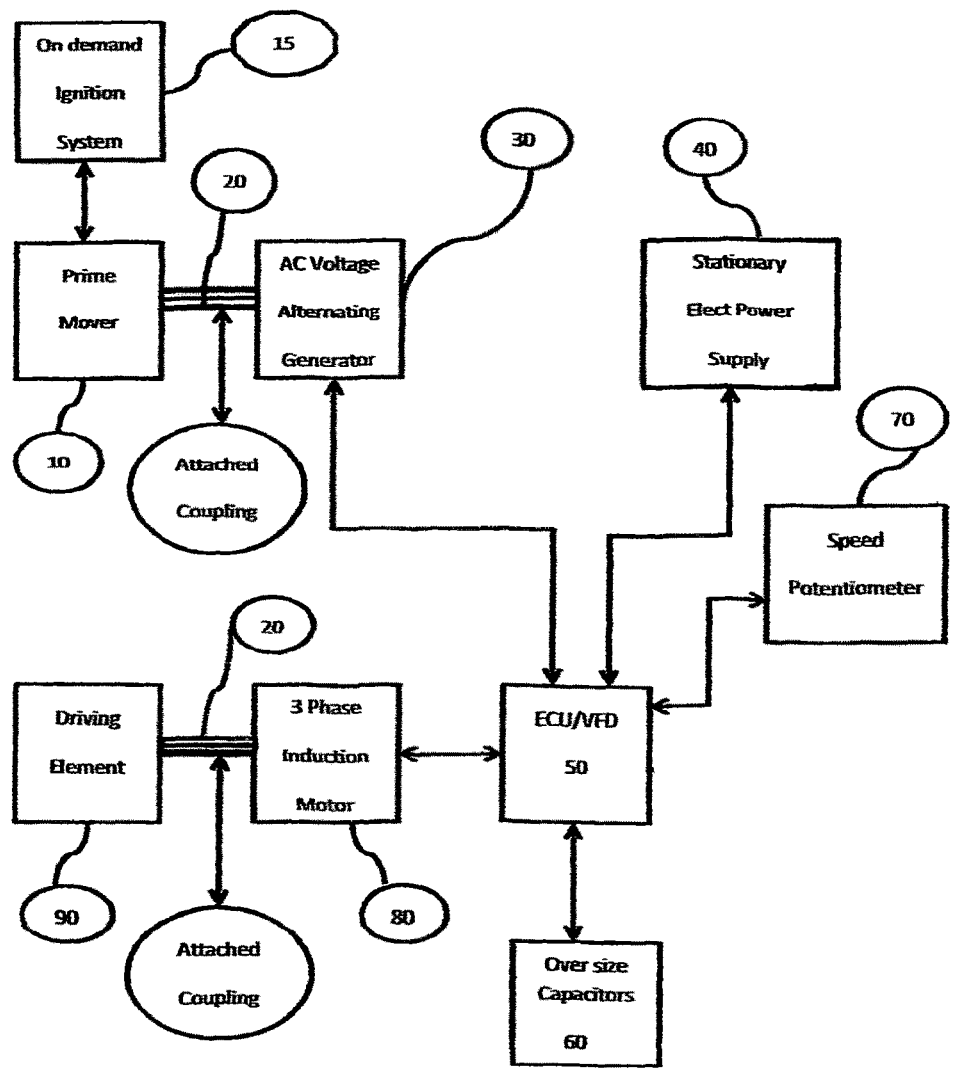
Figure (1) a block diagram of Apparatus and Method.

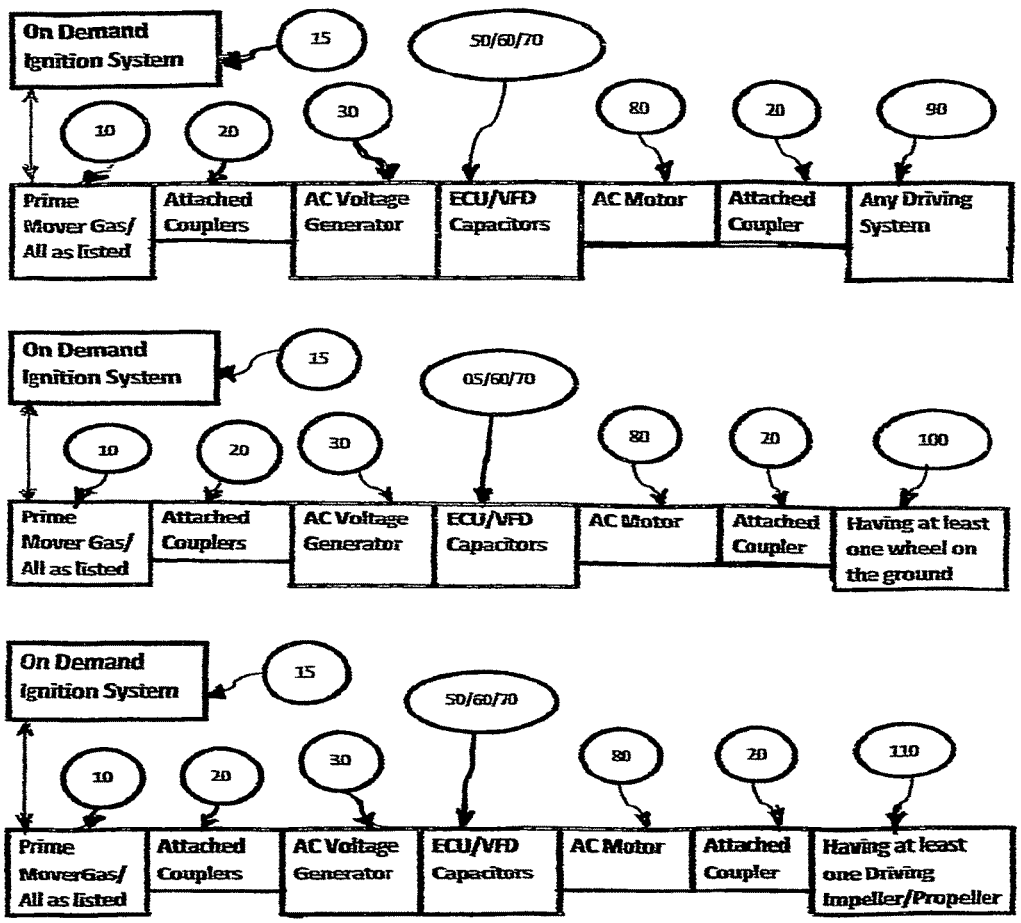
Figure (2) a block diagram of Apparatus and Method.

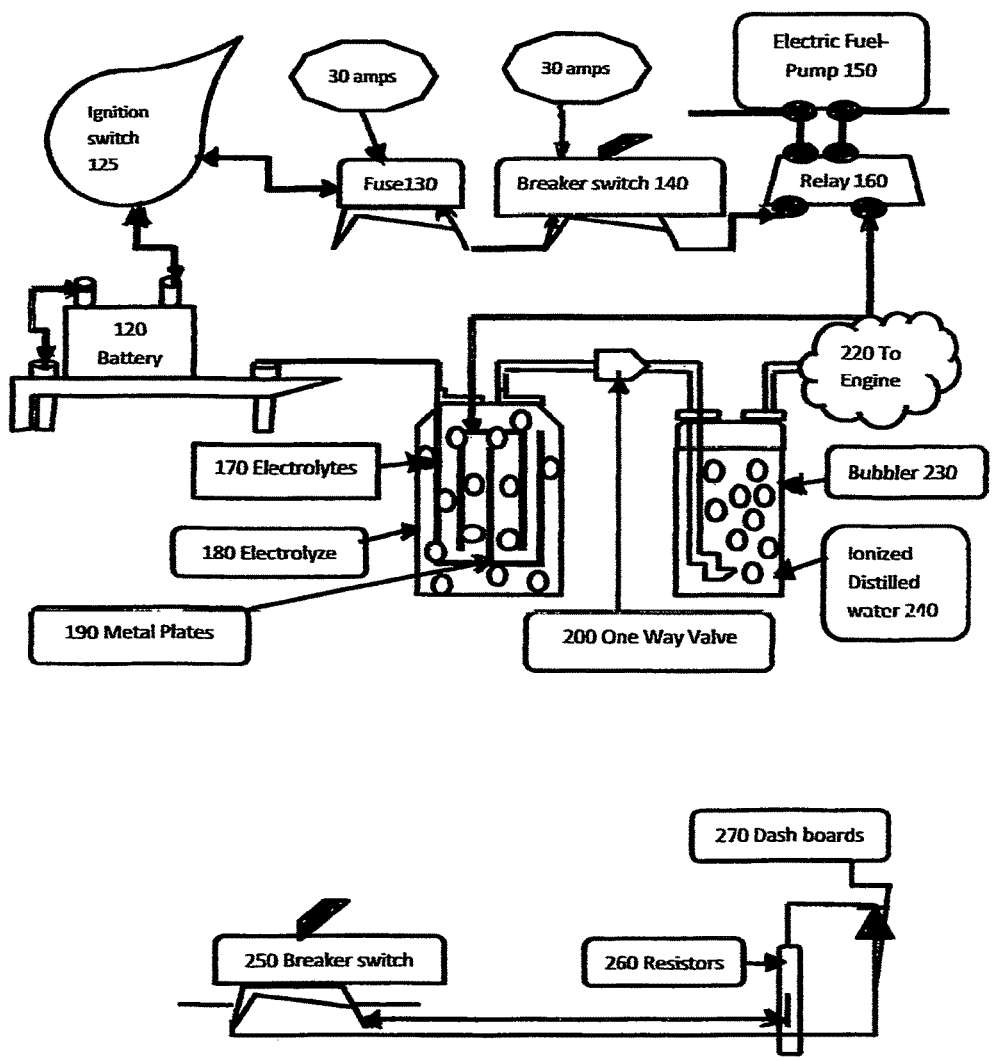
Figure (3) A Block Diagram of The on Demand System

HIGHER-ELECTRO-INFUSION SYSTEMS FOR ELECTRICAL POWER

BACKGROUND OF THE INVENTION

This application is a Continuation In Part (CIP) of application Ser. No. 13/998,996.

Mechanical Combustion Engines, Mechanical Combustion Diesel Engines, Turbine Engines, fueled by Gasoline, Diesel Fuel, or Hydrogen Gas, any type of Gases or in any combination, this Patent completely changes the way Alternators/Generators produces AC/DC Electrical Power, or change D/C to AC, to run 3 phase AC Induction Electric Motors, I made modifications in the Electrical Energy Conversion units/Variable Frequency Drive, known as (ECU/VFD's) to operate 3 phases AC Induction Electric Motors, so it produces Higher Energy savings, at faster speeds by reprogramming the ECU/VFD's, various normal functions, where the Frequency has no upper limit, changing the momentary power loss systems, increasing the capacitor sizes up to 100% and is no longer using a normal 50/60 Hertz per second system to where now, the in-put of 60 Hertz's, the maximum voltage must be reduced by exactly 10.4165%, if the voltage is off by only one volt, over or under the results in torque, energy savings will not occur, the voltage from ECU/VFD's to the motor is reduced near to 37.5%, Alternators/Generators have program changes in a newer advanced systems, this new invention a major technology advancement, all statements or claims are the results these New Principles of Operations, provides very high Commercial values, where this contrarian Invention was, Unsuggested Modifications with the Lack of Assumed Unworkable, insolubility, implementation, or lack of assumed unworkable.

BRIEF SUMMARY OF THE INVENTION

The primary object of this invention, "The Higher Electro-infusion System for Electrical Power" is providing newer methods for controlling internal combustion engines (10), ignited by various known combustion able gases used in different contriving methods, providing higher torque, to operate (30), AC/DC Portable electrical power or (40), Stationary AC/DC electrical power, using voltage transformers, connecting the correct voltages where required, which promotes electrical power from all known forms similar to, wind turbine generators, Solar cell systems, wheel mills, gas, water or, and any contrivable forms of producing rotational power with high enough torque to produce the electrical power requirements to maintain all of the maximum conditions of constant electrical power at all times, wherein a (40), Stationary Alternators/Generators, or (30), AC/DC Portable are attached by a coupling (20), to an (10), internal gasoline combustion engine, a diesel engine, a jet turbine engine to where it can use any type of combustion fuel, or ignitable gas, or used in any combination of combustion fuels, where now, through the contriving program changes in operations, and the methods made in the in-put and out-put of the (50), ECU/VFD'S, (60) oversize capacitors, where the ECU/VFD'S, output Hertz, the Motor voltage must be reduced exactly by 10.4165%, when 60, Hertz's is reduced by (1), Hertz, it goes into 59, Hertz which is at the high end of the (50), Hertz cycle, providing high voltage, higher amps, where no limit is set to the highest frequency used in the (50), ECU/VFD'S, oversize capacitors (60), where the RPM is obtaining the highest possible torque, then reducing the RPM to where it is using less energy now and is more acceptable to the in-put and the out-put to the electric motor (80), is reduced about 37.5%, all of these different changes is in accordance with the this process for achieving "The Higher-Electro infusion System for Electrical Power" preferred embodiments of comprising of an Apparatus and Method is used in the (50) Hertz ECU/VFD'S, (60) oversize capacitators, where (15), "The on Demand Ignition System" produces hydrogen gas only into the Ignition System of the combustion engines, where the (125) ignition switch is turned on (10), the prime mover, going through two a breaker switch's (130) & (140), which each has light-emitting diode goes on when the current goes through the breakers switches, the first switch (130), so you can tell if it is running or not, a the second switch can be used (140), also has a light to see if it is on, in case the first switch is disabled for reason, as the governor on the (10), prime mover maintains a constant RPM, to the prime mover (10), depending on the demand placed on it from the (80), 3 phase induction motor applications, this allows an energy savings throughout the RPM range, where these changes as in my Patent Application was never used in this manner to obtain these results, whether the Electrical Power comes from a (30) an A.C. alternating generator, or (40) an Stationary Electric Lack of Assumed Unworkable, insolubility, implementation, or lack of assumed unworkable, maybe used in "FIG. 2 and FIG. 3, maybe used in any combination for all applications as Power Supply source, where this contrarian Invention was, Unsuggested Modifications with the disable for the most efficient, energy with the highest torque for any application, where ECU/VFD'S, (50) & oversize capacitors (60) Hertz, where the in-put programmable programs have never applied in this manner to control/operate 80, 3 phase electrical motors using ECU/VFD'S (50), oversize capacitors (60), potentiometers (70), any driving system (90), having at least one wheel on the ground (100), having at least one driving impeller, or propeller (110), unit programs in ECU/VFD'S, where it is using up to 100% larger size capacitors systems, internal or external, or both, controlled by (70) one, or two speed potentiometers can be used to control more systems. When the H.P. of any ECU/VFD, has been increased for larger size H.P. motors, it was necessary to increase the size of the Capacitor System, so there is the added Electrical Power required operating all of the functions;

In the past, it was realized that the capacitors where not powerful enough, so additional larger capacitors where added by putting the capacitors in a container outside of the ECU/VFD at first. Then soon after that, the capacitor system was made as a single unit. This is where I came up with the term a standard inside UCU/FVD (50) and the outside external larger size capacitors (60), allowing the new size to go up to 100%, as required for a much higher torque as need;

I have added changes in the momentary power loss system, so the ride through system has been increased to approximately 6 times higher than normally used. This provides additional 30% more electrical power throughout the whole speed range, where the Momentary power system can go to 100%;

The system, then will start to increase the electrical power to the loss to the capacitors inside the ECU/VFD (50) or if used the external capacitors (60) from electrical power from the stationary power supply (40), or from an A.C. Voltage/Generator system (30); *

Where there is a need to have control over 2 or more units inside the complete system, where this is known as a "Piggy Back System". This is where the ECU/VFD (50), or if used the external capacitors (60) has all of the voltage required for all of the operational which will be used, is controlled by (70) Potentiometer, by as needed for Electric Motors (80), or other systems require controlling. Concern must high for the applied application and where no be considered that the RPM, torque is too vortexes are created. Where maintaining the highest savings in energy at the highest speed possible. With all of the flexibility of adjustments throughout all of the programs used in unison, the R.P.M. can be maintained at any speeds in 3-phase A.C. induction electrical motors (80), where using any contrivable additional of oversize higher capacitors type systems 80, for faster, or higher torque in any methods of applications which can also be added internally, or added externally or both as required, where added changes in the momentary power loss settings, when the ride through program was increased up to 6 times, is now higher producing 30% power savings throughout the speed range, where the momentary power loss system can be increased up to 100%, before it starts to automatically recharge the system in the ECU/VFD'S, (50) Hertz, the Generator (30), or Stationary power system (40), automatically starts to replace the power drain from the front end diode capacitors contriving systems, starts to obtain more input power from the main power supply the voltage Generator (30), or stationary power system (40), to ECU/VFD'S (50), over size capacitors (60), Stationary programs can provide two potentiometers (70), or more can be added to control several more systems, known as a piggy back operation, potentiometer (70), where it allows speed control, when listed as a single, or multiple units of (70), Potentiometers to allow speed control for the ECU/VFD'S (50), over size capacitors (60), as it may be a required mode for carrying out the invention, when increasing the Motor RPM in the ECU/VFD'S (50), over size capacitors (60), or (70) Potentiometers to the (80), Electric increasing the RPM, concern must be used or vortexes will occur when increasing air to obtain the proper cfm and water well pumps, can cause air bubbles in the water pipes, causing them to break, where in mechanical applications using wheels, the higher the frequency, the higher the torque, the higher RPM, as the wheel speed must be reduced lower by changing the (70), Potentiometer, or changes inside, or the out-side of the (50), ECU/VFD'S/ oversize capacitors (60), while maintaining the highest (80), motor RPMs for mechanical operations, while creating the highest RPMs as possible for the applied Brief Summary of the Invention applications while obtaining the highest energy saving possible. In order to obtain all of these results, all of the systems, claims must be in operation as one complete higher newer variation's for the highest torque and savings.

The Higher Electro-Infusion System for Electrical Power

This invention pertains to shaft-driven propulsion system where wheels are used in motor driven systems, where all known methods of electrical power are produced to operate an Electrical Energy Conversion Unit, a Variable Frequency Drive (ECU & VFD) (50), to control various electrical, mechanical motors systems, where there is obtainable power to operate rotational power systems, for all of the electrical power required to operate 3 phase induction motors, where these forms may come from a private or public stationary or a portable power supply to operate motor driven wheel systems.

It is well known in the art of wheel driven motors, which can comprise of combustion able Mechanical engines, or AC/DC driven electrical engines which can be controlled by an Electrical Energy conversion Unit, a Variable Frequency Drive (ECU & FVD), generated by rotational power high enough to maintain all of the electrical power required by "THE HIGHER ELECTRO-INFUSION SYSTEM FOR ELECTRCIAL POWER", is using a newer form of electrical power, where it is no longer using the standard (50), or (60), cycles per second, this new unique contrived system uses (60), cycles in-put to the (ECU/FvD), where the voltage must be reduced exactly 10.4165%, less hertz, to obtain the correct results, and when using all other frequencies, it must be reduced the same as in (60) cycles, the first reduction will go to (59) hertz, plus my unique modifications in the ECU/VFDs (50), where at present it obtains 30% higher torque, while using fewer amps, set the speed search program, so the ECU &VFD'S, (50) can read what the motor RPM is running at, set the momentary power loss program up to 100% as required for the operation and setting the ride through programs, this allows the ECU/VFD'S (50), to see the motors running in slower RPM'S, where the fixed motor RPM's is running slower than the setting in the ECU &VFD'S, which is higher, the ECU & VFD'S will see it as an electrical power loss, the auto restart program will then start to replace the power drain to the front-end diode system, using the internal, externally, or both into the ECU & VFD'S, replacing this electrical power to the ECU & VFD'S, for the required RPM in which the motor is operating in, will maintain the required electrical power from the main in-put power supply into the ECU & VFD'S for the electric motor required RPM in order to keep the front-end diode systems fully charged, this will require only the in-put electrical power to the ECU/VFD'S, 50, which was drained from the front-end diode systems, when using this combination, where these changes in some of the programs which provides at lower RPMs, with higher torque while using fewer amps, providing a much longer operating RPMs range to operate in using Electrolysis to produce Hydrogen Gas into combustion chambers nearly ¼ of inch, allowing the ultimate, maximum amount of Hydrogen Gas and Gasoline at ignition can generate up to 86,000 combustion maximum of Unites, (BTUs) providing the highest internal combustion engine torque in any operation, when using rotational or stationary generated power using any kind of contrived systems, when all of these claims are operated in unison as a single unit;

In all of the previous systems, where Electrical Energy conversion Unit, a Variable Frequency Drive (ECU/FVD) 50 are used, in order to save energy, the energy work load had to be reduced consequently, you accomplished less in order to save. The work load can be increased and still have enormous savings, which was not possible before my invention and the same with internal gasoline combustion engines, diesel engines, a jet turbine engines placing the fuel injection system, nearly ¼ inch from the combustion unit;

BRIEF DESCRIPTION OF THE DRAWINGS

FIG. 1 is information for the schematic block diagram 1, where

FIG. 2 is information for the schematic block diagram 2 is composed of the apparatus and method;

FIG. 3 is information for the block diagram FIG. 3 in detail how the "On the Demand System" produces Hydrogen Gas only, added to gasoline, or any combustion able fuel into any combustion engines, turbine engines, or functional types of the applicable apparatus are to increase the engine torque;

DETAILED DESCRIPTION OF THE INVENTION

FIG. 1 shows the block diagram that includes the major elements of the apparatus of this invention. The major elements are comprised of a (10), prime-mover in (30), a Portable power source, a (40), Stationary power, Public or Privet, using any form of combustion engines, wind turbine alternating generators, solar cells systems, wheel mills generator, water, or any contrivable sources of electric power to control, operate ECU/VFD'S 50, oversize capacitors 60, controlling electric motors (80), where using voltage transformers connecting the correct voltages where it is required, as now the Momentary Power loss systems, Speed Range Indication, Speed Search Function, RPM Range Function, Restart Monitor Power loss program, where using (60) volts, or, and in all other voltages used, the voltage must be reduced by 10.4165%, for this invention to obtain these types of higher torque and higher energy savings will not be obtained, in (15), The on Demand Ignition System as in (claim 4), produces hydrogen gas where it is then circulated into the (10), prime mover ignition system before the motor starts to run, or after it has started to run with gasoline and hydrogen gas can obtain up to 86,000 BTU's, when the fuel is approximately ¼ inch from the carburetor throat, or intake combustion systems, as a defined system, where any kind of combustion fuel maybe applied to this total system; where (20), the forms attached coupling attachment to (30), an alternating voltage generator and (10), prime mover, where (30), a portable power source is used for electrical power, in the best mode of this invention is connected by a 20, attached coupling, to a portable power source (30), ECU/VFD'S (50), oversize capacitors (60), stationary power Public or Privet (40), wind turbine alternating generators, solar cells systems, wheel mills generator, water, or contrivable sources of electric power operating, as transformers can be selected for various electrical operations as required, and, or select the electrical power to operate in ECU/VFD's (50), oversize capacitors (60), where two speed potentiometers 70, are used to control more than one system, known as a piggy back operation (70), where it allows speed control, which may be listed as a single, or multiple units in conjunction with a ECU &VFD's (50), oversize capacitors (60), or using standard size front-end diode capacitors for the electric motors used or selecting larger size front size diode capacitors in any conversing systems using 20, coupling, generator (30), ECU/VFD's (50), oversize capacitors (60), speed Potentiometers (70), internally, externally or both, 3 phase AC/DC electrical power, or where AC/DC electrical power, when DC electrical power is converted to run (80), AC 3 phase induction motors using any contrivable forms of gearing, pulleys or using higher RPM motors when used in any manner to increase the electrical power (80), when now in the ECU/VFD (50), over size capacitors (60), it has started using the momentary power loss program, where it has only been increased up to only 7, times, this provides an increase of 30% more power through the speed range, where there is no limit needs to be placed on the number of times, as it can be increased up to 100%, where the RPM in the Momentary Power loss, Speed Range Indication, Speed Search Function, RPM Range Function, Restart Monitor Power loss program, where all of the different applied Voltages applied must be reduced by 10.4165% or the functions, the Torque, Energy Saving will not be obtained, the auto restart up time program system is used in unison will start to replace the power drain from the front-end diode capacitor systems in the ECU/VFDs (50), oversize capacitors (60), or any system operating AC 3 phase induction motors (80), is connected to the ECU/VFD's (50), oversize capacitors 60, when using any driving system (90), or having at least one wheel on the ground ((100), or a pump, a propeller or impeller (110), where a coupling (20), is then connected to electric motors (80), to speed potentiometer meters (70), is connected to the ECU & VFD's (50), oversize capacitors 60.

FIG. 2 Has all of the major elements of the methods of the invention. A (30), Portable an alternating voltage generator producing AC/DC electrical power, where the size of the capacitor systems in ECU/VFDs (50), oversize capacitors (60), are used up to 100% higher than normally U.S. patent Ser. No. 11/998,996 used in a designated a three phase electrical induction motor 80 application, when using 30, Generator, ECU & VFD's 50, oversize capacitors 60, portable power source or stationary power source 40, ECU/VFD's 50, oversize capacitors 60/a stationary AC/DC electrical power from all of well-known contriving rotational power means of electrical equipment or, and all known electrical power to be used is selected or the ECU & VFDs 50, oversize capacitors 60, a voltage requirement which is determined for the 80, motor application by referring to the manufacture requirements or any NEMA voltage standards which are available for the application and select the lowest voltage based upon the motor name plate voltage range, which is programmed into ECU & VFDs 50, oversize capacitors speed Potentiometers 70, 60, the frequencies are no longer programmed to operate in any contriving 50, oversize capacitors 60, the frequencies 80, motor range, where now it is started at 60 hertz, then reduced by 10.4165%, or 60 hertz to operate up to the maximum frequency range of 100% as required to obtain the highest torque with the highest savings required, from the ECU/VFDs 50, oversize capacitors 60, in the 80, motor required by the manufacture, can now be set to the higher frequency, where the higher RPM range it will automatically go down to the amps range of the maximum load in which the 80, Motor is capable of operating in for the application, and keeping in mind, that running electric motors too fast, it can reduce the motor life, or use a motor that is designed for a higher RPM, all of the new programming must be entered in to the 50 & 60, ECU/VFD, before the 80, motor is turned on or the 80, motor will destroy its self and everything with it. "The Higher-Electro-infusion System for Electrical Power invention is unique and novel, when operating as stated, a complete system as where all the claims are used". When using higher voltage, amps, frequencies, RPMs, are proportionally too fast for most applications, it must be reduced from the ECU/VFD'S, 50, and over size capacitors to the electric motors to an acceptable operating range required by the application, where according to the "Laws of Physics, when higher RPMs, are reduced to a slower RPMs, the torque is increased; therefore fewer gears or no gears are required. This allows a much wider range to operate within.

FIG. 3 Include all of the major elements and methods is providing this information on "The on Demand System", of this invention and providing 1 of 3 different methods in several applications showing how they are be applied in my applications; "The on Demand System" is an electrolysis system for providing hydrogen gas only to the 10, prime mover, when using electrical current from Alternators/Generators, and, or, from 120, a battery, then going through metal plates 190, and, or a mixture of Potassium Hydroxide of approximately 50, gm's in one half gallon of Distilled water 240, or ionized water producing Hydrogen Gas 220, can be replaced by any combination on gas, where the gas combination is placed where it can be turned on or off by the ignition switch 125, while the engine is running for the purpose of turning off the hydrogen gas 220, where it is prohibited by law or when extra power is not required or keep the possibility of the booster from beginning on when the motor is not United running instead, wired a standard automotive rely a cross the electric fuel pump 150, and let the relay 160, carry the booster current, the fuel pump 150, is powered down automatically, if the engine stops running, it will power down the booster, another safety feature in case of an short-circuit occurring in the booster system, put in a fuse 130, or contact between the batteries 120, and the new circuitry as of a valve is placed in the pipe between the shown as shown using a contactor breaker 140, then a light emitting diode 270, with an element resister at 680 ohms, or higher in a series wired directly across the contacts breaker 130, the LED is mounted on the dash board and is normally closed so no light 130 is tripped and then the LED will light up to show that the circuit breaker has been operated 140 the current is lower in the electrolyze switch 180 is effectively switched off as an extra safety feature, where the Booster contains a number of metal plates 190 and allows the water to breakup into hydrogen gas mixture at 50 gm, which is a simpler container with distilled water 240, which is gas bobbling up from the bottom up, where the gas collects above the water surface, then into the booster where it cools down, preventing it from working loose causing a spark in the gas field above the surface the liquid is a safety feature, the gasoline or diesel fuel mixture of hydrogen gas 220 or any other combustible gasses in any number of carburetors or number of fuel injectors engines system are placed approximately % of an inch above the air in intake injections, or combination systems, as a defined system, a defined prime booster mover combination, where this system must be operated in unison with the complete Patented system as presented in this Patented Application, or it will not produce the defend results; Also these applications listed can be applied to any voltage system obtaining the same results when applied.

What is claimed is:
1. An on demand electrical system comprising:
an on demand ignition switch that starts a prime mover device, this prime mover device is operatively coupled to an AC voltage generator, thereby providing the mechanical energy necessary to produce electrical voltage power,
this voltage is subsequently supplied to a variable frequency drive (VFD),
this VFD can also be supplied with emergency power from a stationary electrical power supply,
this VFD has control circuitry that is comprised of a speed potentiometer and oversized capacitors,
this VFD further supplies electrical power to a three-phase induction motor, this motor is operatively coupled to a driving element thereby capable of supplying motive energy to a driving element.

* * * * *